Patented Nov. 14, 1944

2,362,489

UNITED STATES PATENT OFFICE 2,362,489

GRANULAR MATERIAL AND METHOD OF MAKING THE SAME

Clifford L. Jewett, Minneapolis, Minn., assignor to Minnesota Mining & Manufacturing Company, St. Paul, Minn., a corporation of Delaware No Drawing. Application September 27, 1938, Serial No. 232,009

3 Claims. (Cl. 117—100)

This application is a continuation in part of application Serial No. 760,040.

This invention relates in general to granular material of a mineral, silicious, or like nature. More particularly it concerns an improved process for treating or coating such granular or comminuted material, the product resulting therefrom, and a roofing or other product in which the treated granular or like material may be incorporated.

This application is a continuation in part of or substitute for my prior application Serial No. 760,040, filed December 31, 1934, (the latter, in turn, being a continuation in part of my application Serial No. 700,632, filed December 1, 1933) and is a continuation in part of application Serial No. 752,886, filed by George W. Swenson and myself on November 13, 1934. In certain respects, this application is also a continuation in part of application Serial No. 177,080 filed November 29, 1937, in which I am named as an inventor. While the treated or coated granules of this invention are described and illustrated herein largely in connection with mineral or weather-resisting covering for roofing sheet or the like, it will be understood that my invention finds a wide field of utility for other uses, e. g. including weather-proofing, decorative purposes and other analogous or related uses.

The treated or coated granules or particles of this invention may be incorporated as a coating for mineralizing the surface of a roofing shingle, or as an aggregate for incorporation in artificial stone such as cast stone and the like. For the base granule which is to be coated, I may employ natural or artificial mineral substances, such, for example, as slags, slate or igneous rock, but my invention has especial utility in the coating of materials of substantial translucency and more particularly those of high translucency, including quartz, quartzite, novaculite, feldspar and certain igneous rock, for example. Though my invention is of high utility in the opacifying of translucent granules, in the broader aspects of my invention, other mineral, silicious or related substances may be employed as the base granules, including most of the minerals which are usually found in the ordinary gravel pit, as well as crushed brick, baked clay, porcelain, terra cotta and the like, whether of natural or synthetic origin.

In general I prefer to employ comminuted or granular material, especially translucent material, which is relatively or substantially free of impurities such as iron, manganese, and the like, and this so as to avoid discoloration of the coating where the conditions of the coating operation are such that some reaction may take place between components of the coating material and ingredients of the base granules. However, under particular circumstances where no substantial discoloration will be caused thereby, because of relatively low temperatures employed in the coating operation (or where the coating is not actually fused) or because of the relative nature of the coating composition and the base granules, types of base granule which are relatively opaque and which contain impurities, such as those above mentioned, may be employed and this type of base granule may be found in most any gravel pit or quarry.

Heretofore, efforts have been made to treat crushed mineral material with a color bound to the granule with an organic bond, but this is unsuited for many purposes, inasmuch as the colors are only indifferently permanent, and the organic bond does not have the life or ageing characteristics necessary, particularly where it is desired to employ the granules in cast stone, roofing material, and the like.

As an alternative, inorganic bonds have been experimented with to some extent. While some attempts have been made by others (as described in published patents) to employ materials of the nature of quartz or quartzite as base granules for coating operations, so far as is known these attempts never reached the stage of practical success prior to the present invention and the coated granules had various unacceptable deficiencies, including their inability to adhere to roofing materials having a bituminous or asphaltic binder over any substantial period of time, and/or lack of color permanence, and/or poor adhesion of the colored coating to the base granules, etc. As a result of these difficulties, the trend has been strongly in favor of employing materials such as slate, blast furnace slag, and the like as a starting material (as base granules), such material being then given some sort of a coating treatment, e. g. being provided with a coating of unfused, dehydrated sodium silicate. Where attempts have been made to fuse a coating, such as last mentioned, onto the surfaces of slag or slate particles, such a fused coating was produced only at the sacrifice of discoloration of the coating due to reaction with or contamination by impurities in the base granules.

With these prior art methods, while highly glazed, coated granules have been produced, as above indicated the use of the same for mineralizing a roofing sheet comprising adhesives such, for example, as asphalt, has been attended with difficulties. Adequate adhesion between the asphalt sheet and the coated granules has not been secured in many cases, and further such initial adhesion as has been attained has not been of an enduring nature.

A careful investigation of the problem of producing a satisfactory article in the nature of roofing material, having coated granules or particles joined to a base by an adhesive such as asphalt or other bitumen, lead me to the conclusion that the matter of light transmission was a critical part of the problem. My further investigation of this matter of light transmission disclosed the fact that adhesives, such as asphalt coatings, when exposed to light within the wave length range of 2900 to 4700 Angstrom units for a period of time lose their adhesive properties to a large extent. In view of these findings, without foregoing the advantages of using translucent base granules, such as quartzitic granules, I coated these granules with a substantially opaque coating (as herein otherwise described) and applied them to the asphalt coating of a roofing sheet and exposed the latter to the elements, including direct sunlight. This experiment not only confirmed by former findings as to the photosensitive character of the asphalt but further showed that the opaque coating on the surfaces of the particles or granules, which latter were distributed over and embedded in the layer of asphalt, substantially retarded or prevented the deterioration of the asphalt and/or the loss of its adhesive or adhering properties. The opacified granules remained firmly attached to the adhesive layer even after protracted periods of exposure to sunlight and also after extended exposure to artificial light of controlled wave length.

In investigations with light of controlled wave length, the range of approximately 2900 to 4700 Angstrom units was found generally to be most harmful. Also, in order to maintain good adhesion between coated granules and asphalt or like adhesive, by making quantitative measurements of percent of transmitted light in this band or range by means of a photographic registration, I found that it is necessary that the coating applied to the translucent granules be of a sufficiently opacifying character that not more than 1.5 or 1 percent, and preferably not more than 0.5 of one percent, or less, of the incident light with the wave length range of 2900 to 4700 Angstrom units passes through the coated granules embedded in the adhesive.

The photographic registration or test just referred to is the only known method of making such measurements and is a test developed in the laboratories of Minnesota Mining & Manufacturing Company and now employed by others in this art. In carrying out this test granules are placed in a single layer on a photographic plate or film and are exposed to light of the band or range chosen, e. g. approximately 2900 to 4700 Angstrom units. The degree of blackening of the photographic material, as shown upon development of the film or plate, constitutes the measurement of the percent of incident light which is allowed to pass or is transmitted by the granules.

In furtherance of what is said above as to the nature of my coated granules, I have discovered that a granular material in which the individual surfaces of the granules are provided with a relatively matte or dull exterior surface provides much improved adhesion between the granule itself and the adhesive sheeting forming the waterproof base sheet for the roofing material. I am aware that it has been suggested by others that rough surfaced granules may be attained by employing a coating material made up of high melting frit and low melting frit, the theory being that the low melting frit will fuse and the high melting frit will remain unfused. However, this theoretical result is difficultly attainable in practice, if in fact it can be accomplished on any actual or practicable scale, because the low melting frit tends to dissolve the higher melting frit. Hence it will be seen that such a procedure not only fails to insure uniformity of results but even fails to teach any really practicable operation, and fails to teach any satisfactory method for producing particles or granules having a matte, substantially opaque coating.

A salient object and advantage of my invention involves the provision of a coating on a particle or granular material, e. g. of a silicious nature, whether of mineral or synthetic origin, which includes a binder and a comminuted material which is inert during the firing, that is to say, which does not melt down with the binder but remains unfused and unreacted but at the same time suspended and disseminated in the binder so that a matte, relatively opaque exterior coating is presented upon completion of the process.

This invention in certain aspects thereof has, as further objects, the provision of an improved artificially colored granular material which may be manufactured with a wide range of colors of desired permanence and at reasonable cost; the provision of artificially colored granules in which the coating applied thereto has a good bonding action on the granule and in which the coloring material is firmly affixed to the base granule by the binder; the provision of an improved coated granular material which exhibits high resistance to deterioration under changing weather conditions, and in which the control of temperatures for producing a fluxing or a binding of the coloring material to the base granule may be varied without losing effectiveness in binding the coloring material to the granule; and the provision of an improved process of producing coated granular material in which the steps of carrying out the process of manufacturing the same are reduced, thereby to reduce the cost of manufacture.

This invention further contemplates the provision of an improved granular material in which a colored coating is affixed to the individual surfaces of the granules in a permanent manner and in which the coating has the property of desired fluidity or viscosity of the binder so as to facilitate the suspension of the coloring material therein without reaction during the firing process and thus insure substantially uniform distribution of the coloring coating over the surfaces of the granules.

For the purpose of my invention I have employed various granular base materials, but have preferred material of the nature of quartzite or novaculite, for example, due to their relative freedom from impurities, their natures which make them adaptable for use in making coated granules having bright or brilliant coatings, and also because of their ready availability. It will, however, be understood that, with the temperatures employed for producing the results herein described, base granules of various types may be employed, the temperatures employed and duration of firing being governed largely by the character of the flux and/or binder employed and/or the quantity and nature of the inert material suspended in the binder.

I have discovered that, by employing a vitrifiable or fusible binder together with a relatively inert or unfusible material (that is to say, a material which does not react with the fusible binder and is not reduced to a fused state during the coating or firing process), especially where the inert material is present in substantial amount and in a state of wide and substantially uniform dissemination in the fusible binder, a resulting coated granular product is attained which is of important utility and obviates many of the disadvantages of products suggested by the prior art. In particular granules made in this manner adhere well to bituminous or asphaltic binders, as well as to other adhesives including photosensitive adhesives, and such adherence continues even after substantial or long periods of exposure to atmospheric conditions.

The inert material may be and usually advantageously is a colored material or pigment. There are a number of pigmenting materials available to me which do not react at the temperatures necessary to produce a fusion of the binder which is employed, and thus when the granular material is finished, i. e. is coated, it presents a coating which contains unfused particles disseminated in a fused, or at least sintered, binder, thus presenting a matte or relatively or substantially opaque exterior surface.

The process of my invention in one of its forms is carried out by first crushing a mineral material to a desired size, and for this base material I have advantageously employed quartz and quartzite ground to the size desired. This granular material may then be treated with an aqueous solution of a binder which, for example, may comprise sodium dichromate. I have employed other materials in the aqueous solution for this purpose such, for example, as borax.

When the quartz or quartzite base material is thus coated with the aqueous solution referred to, the remaining ingredients of the coating to be applied are added, usually in a dry powdered condition. Where a chromate or dichromate is employed, in accordance with the prior application of George W. Swenson and myself, referred to above, it is customary to employ a reducing agent such, for example, as coke, coal, sulphur or mixtures thereof, or mixtures containing the same, in order to insure the substantially complete reduction of the chromate or dichromate or the like and thus assure the absence of water-soluble compounds of chromium, or the like, in the final coated granules.

After a thorough mixing of the batch, the same may be dried so as to produce a layer or coating on the individual surfaces of the granules, and this coating may contain material, for example, according to the following formula:

Formula 1

| | Grams |
|---|---|
| Quartz | 500 |
| Sodium dichromate | 4 |
| Chromium oxide | 2 |
| Kaolin | 1 |
| Borax | 0.25 |
| Fluorspar | 0.25 |

From the foregoing formula, the kaolin and borax, as well as some of the remainder of the ingredients, form a flux or binder for the colored unfused material or pigment which is primarily chromium oxide. Chromium oxide is employed, inasmuch as it is relatively inert and does not react with the binder when subjected to firing temperatures which will fuse the binder. The chromium oxide in the final matte coating may consist of chromium oxide added as such and chromium oxide resulting from decomposition of sodium dichromate. From the formula given above, the total chromium oxide content of the final coated granules may be approximately 4 grams, 2 grams thereof being made up of the chromium oxide added as such and the remainder resulting from decomposition of the dichromate.

After the granular material has been treated with a coating as hereinabove described, and the coating is dried, the batch is then introduced into a kiln, which may be a rotary kiln, and subjected to constant agitation and to heat at temperatures within the range of about 1600°–2100° F. (e. g. roughly 900° C. to 1100° C.) for a period of about ten minutes, more or less.

It will be understood that in the formula above referred to, and when processed at the temperatures of the order of those mentioned, some of the ingredients (i. e. the binder portion of the coating) becomes fused, and in such cases it is preferable to select base granules which are relatively free from impurities, which latter might be released and adversely affect the color desired. However, where temperatures are employed which produce merely a sintering, i. e. temperatures of (or approaching) incipient fusion, where coalescence occurs but no fusion is effected, then there is less tendency for undesirable impurities, where present, to discolor or deleteriously affect the desired coating, and hence in this latter case there is less need for base granules, such as quartzite, which are substantially free of impurities. (Sintering, as distinguished from actual fusion, is illustrated by the making of porcelain or chinaware.)

Other formulas which have been found to give satisfactory results in producing relatively opaque coatings on translucent bases follow.

Formula 2

| | Pounds |
|---|---|
| Granules | 2,000 |
| Sodium dichromate | 36 |
| Boric acid | 15 |
| Kaolin | 30 |
| Coal | 6 |

Formula 3

| | Pounds |
|---|---|
| Granules | 2,000 |
| Sodium dichromate | 50 |
| Boric acid | 10 |
| Kaolin | 3 |
| Coal and/or coke | 3 |

The above formulas or compositions, while they may be applied to granules or coated thereon in any chosen manner where vitrification of the binder portion of the coating is involved, have been employed with advantageous results especially where the binder portion of the coating was fused during the coating operation.

Reference has been made above to the property of desired fluidity or viscosity of the binder of the coating composition so as to facilitate the suspension and dissemination of the coloring material therein. This is not such a difficult matter where extremely opaque pigments such as red iron oxide are employed. However, in the case of some pigments, as for example, chrome oxide, which do not have the covering or hiding power of iron oxide, there is a greater and an important need for very good dispersion of the pigment in the binder in order to attain desired opacity of coating with proportions of inert pigment to binder of the order illustrated above. I have found that under some conditions where chrome oxide is used even in a proportion by weight equal to the amount of the binder that insufficient distribution has occurred in certain instances in the coating process, and that the required opacity has not been obtained. However, where sodium dichromate, for example, is used as the source of chrome oxide as in Formula 2 and Formula 3, above, then as the granules are heated the sodium dichromate first melts (at about 325° C.) and completely coats the granules before any chrome oxide is produced. Fused sodium dichromate is a somewhat oily, "creepy" liquid, having good spreading and covering properties. Upon further heating (e. g. in the presence of coal and/or coke or like reducing agents) the sodium dichromate is reduced in situ on the surfaces of individual granules to form unfused chrome oxide which is highly dispersed in the glaze or binder, the soda from the dichromate entering into the composition of the binder. In this way, distribution or wide dissemination of the pigment (chrome oxide) is attained and the opacity of the coating is accordingly enhanced. In this manner, for example, the problem of securing adequate distribution of inert, unfused pigment in a vitrified or fused binder may be advantageously solved. This matter of adequate distribution or dissemination of the pigment in the binder is one of the most important factors in attaining desired opacity, especially in the case of pigments such as chrome oxide.

The following formula is an example of a matte opaque coating of a buff color in which the bond for the pigment may advantageously be in a sintered condition, for example. The inert pigment which (in the case of the following formula) remains infused in the sintered binder is a reaction product of zinc oxide and an iron salt, in this case ferrous sulphate.

Formula 4

| | Pounds |
|---|---|
| Granules | 2,000 |
| Zinc oxide | 20 |
| Ferrous sulphate | 50 |
| Clay | 12 |
| Boric acid | 10 |
| Chrome oxide | 2.5 |
| Water | 40 |

In Formula 4 the proportion of chrome oxide may be varied as desired as it acts as a toner for the color. Clay also acts as a toner in the above formula. In Formula 4 the proportion of chrome oxide may be varied as desired, one of its chief functions in this case being to act as a toner for the colored compound or pigment which is the reaction product of zinc oxide and the iron salt. It is believed that, under the temperatures employed during coating, a part of the zinc oxide reacts with the ferrous sulphate to produce an inert buff pigment, while remaining portions of the zinc oxide react with the boric acid and produce a sintered binder or bond in which is suspended the unfused and unvitrified buff pigment.

The following is illustrative of another composition which may be employed in coating granules or the like and, as in the case of Formula 4, though not limited thereto, is especially adapted for use where the vitrified binder portion of the coating is not fused but rather is simply sintered.

Formula 5

| | Pounds |
|---|---|
| Quartz granules | 2,000 |
| Kaolin | 20 |
| Sodium dichromate | 28 |
| Water | 40 |

It will be noted that in the case of Formula 5, the inert coloring material in the final coating is made up of chrome oxide, whereas in the case of Formula 4, the main coloring material or pigment consisted of a reaction product of zinc oxide and an iron salt, with chromium oxide serving primarily as a toner.

It will be understood that the temperatures employed in coating operations, where coating compositions such as shown by the above formulas, for example, are used, may be varied within a substantial range of temperatures (such as from 1700° F. or less to 2000° F. or more). However, other factors being comparable, higher temperatures are commonly employed where a fused type of binder is desired than where a sintered type of binder is desired in the coating. Specific temperatures employed in any specific case will depend, not only upon whether a fused or sintered type of binder is desired for the unfused, inert material or pigment in the coating, but also will depend upon the character and amount of fluxing ingredients present in the coating, for example.

The granular material, after being fired to coat the same with materials such as illustrated by any of the above formulas, may then be cooled, normally in a gradual manner. Upon inspection under the microscope of granules so coated, they will be found to possess a coating in which an inert or unfused material, such as a chrome oxide pigment, is disseminated in a vitrified or fused binder, such as one containing clay, borax, etc., the fused or sintered binder holding the firmly divided inert material on the granules (in fixed relation to the surfaces of the base granules).

From the foregoing it will be understood that my invention, among other things, provides for the production of a granular or like material having a coating thereon comprising a fused or other vitrified binder in which there is suspended or disseminated an inert material in quantities and of a character sufficient to produce a matte coating which is substantially opaque and, where in accordance with a preferred aspect of this invention, a translucent base granule is employed, serves to opacify the same. As above referred to, this opacification is important, especially where the coated granules are employed in connection with photosensitive adhesives or the like, e. g. asphalts or bitumens employed in roofing, etc.

Owing to the relative fluidity and low viscosity of the binder when the fused type of binder is employed, the binder readily adheres to the surfaces of the individual granules and thus forms a thin layer or film over surfaces of the granules in which is suspended the inert comminuted material, e. g. a finely divided unfused pigment, in amount and proportion sufficient to lend the desired matte appearance and/or opacity to the coated granules or particles.

For carrying out the process of heating, I have employed a rotary kiln in which the temperatures range, between the entrance end of the kiln and its central portion, from about 200° F. to 900° F., and between the central or medial portion and the discharge end of the kiln, up as high as 1600° F. or even as high or higher than 2000° F., as desired in any particular case.

It is to be understood, as above referred to, that the temperature range and the duration of treatment of the material are subject to variations, depending on what materials are employed as the binder and what materials are employed as the inert or pigmenting material. However, according to the present invention it is preferred that the inert materials or pigments be of a type such as illustrated above (e. g. chrome oxide, etc.) which does not react with the other or binder portions of the coating or fuse therewith at any temperatures of the order of those employed in sintering or fusing the binder, but, on the other hand, remains unreacted and unfused at temperatures far above (e. g. 400° F., 600° F., or more above) those employed in the coating operations.

While the formulas presented above illustrate various suitable weight ratios of inert, unfused material or pigment to vitrified or fused binder, the ratio of the inert material to the binder must generally be at least as great as about 4:6 and, on the other hand not greater than about 8:2, and usually the ratio of inert material to binder is preferably at least as great as 5:5 or 6:4 and not greater than about 7.5:2.5.

While hereinabove I have illustrated the inert, unfused material of the coating composition of my granules by a green or greenish material such as chrome oxide, and by a buff pigment such as results from the interaction of zinc oxide and ferrous sulphate (with or without chrome oxide as a toner), it will be understood that various other pigments of various colors are contemplated. For example, red iron oxide may be employed but, where temperatures are brought up to the fusion point in coating, the final color effect is not the normal brilliant red of pure $Fe_2O_3$ but rather is a maroon or brownish color. Where black coated granules are desired, coating compositions comprising a chrome bearing material such as sodium dichromate and ferrous sulphate, with a reducing agent such as coal, may be employed. Other materials, such as calcium phosphate, tin oxide and/or zirconium oxide for example, may be employed in a dispersed state in the binder of the coating, for example, in admixture with other inert materials which are colored such as chrome oxide, iron oxide, the reaction product of zinc oxide and ferrous sulphate, etc. The reaction product of sodium dichromate and ferrous sulphate, where applied in the absence of a reducing agent such as coal, may be controlled to produce brown colored granules of the type herein defined which are of commercial importance. Thus, it will be seen that, by employing various inert pigmenting materials, coated granules of various colors (e. g. green, brown, black, buff, etc.) may be produced.

While boric acid has been mentioned hereinabove (as in Formulas 2 and 3) as a flux for or component of the vitrifiable or glaze-forming ingredients of the coating composition, it will be understood that borax and/or $Na_2O$ may partially or entirely replace the boric acid in the coating composition. There are other materials, which may be used in combination with boric acid and/or borax, and serve as a component of the glaze and help to lower the melting point of the latter.

Where in the formulas given hereinabove, granules such as quartzite are mentioned without any reference being made to the size of the same, it will be understood that the granules specifically contemplated in those examples are of such size that they will pass a "10-mesh" screen and be retained on a "35-mesh" screen. However, it will be understood that the invention is not limited to granules of such size but contemplates the treatment of granules or comminuted material generally. Where smaller granules (having a higher amount of surface area) are coated, the quantity of coating materials should be accordingly increased to obtain similar results; whereas, where larger granules or comminuted materials are employed, less coating material is needed per ton of granules.

While hereinabove in describing my invention, I have employed various specific illustrations, it will be understood that these are simply exemplary. All modifications or variations within the scope of the appended claims are comprehended.

Having thus described my invention and illustrated its use, what I claim is new and desire to secure by Letters Patent, is:

1. As an article of manufacture, a translucent comminuted or granular mineral material having individual granules or particles thereof coated with an opacifying coating comprising finely divided unfused colored metalliferous material substantially uniformly disseminated in a translucent weather-resistant ceramic vitrified binder, said metalliferous material being present in sufficient amount and in sufficiently high proportion in relation to said binder as to render said coating of such opacity that less than 0.5 of one percent of incident light within the wave length range of 2900 to 4700 Angstrom units will pass through the said coated granules, said metalliferous material being that resulting from the interaction at elevated temperatures of oxides of chromium and zinc and iron sulphate.

2. As an article of manufacture, a translucent comminuted or granular mineral material having individual granules or particles thereof coated with an opacifying coating comprising finely divided unfused colored metalliferous material disseminated in a solid, fused weather-resistant siliceous binder, said metalliferous material being present in sufficient amount and in sufficiently high proportion in relation to said binder as to render said coating of such opacity that less than 0.5 of one percent of incident light within the wave length range of 2900 to 4700 Angstrom units will pass through the said coated granules, said metalliferous material being that resulting from the reaction at elevated temperatures of zinc oxide and ferrous sulphate.

3. As a new article of manufacture, a roofing sheet material including a photosensitive bituminous binder having a surface coating of artificially colored roofing granules as defined in claim 1.

CLIFFORD L. JEWETT.